I. W. MARTIN.
Thrashing Machine.
No. 92,072.  Patented June 29, 1869.
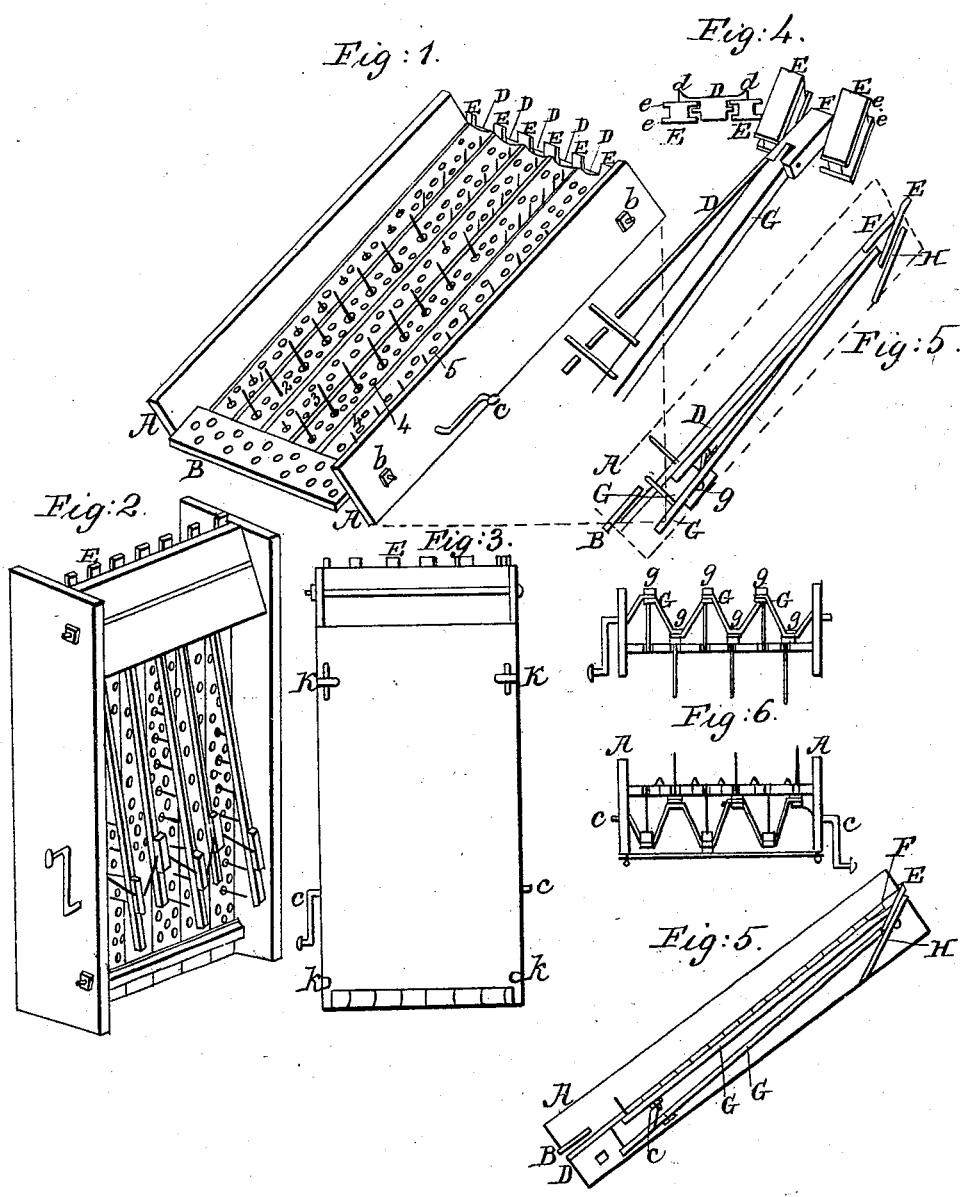

United States Patent Office.

ISAAC W. MARTIN, OF GOODVILLE, PENNSYLVANIA.

*Letters Patent No. 92,072, dated June 29, 1869.*

---

IMPROVEMENT IN THRESHING-MACHINES.

---

The Schedule referred to in these Letters Patent and making part of the same.

---

*To all whom it may concern:*

Be it known that I, ISAAC W. MARTIN, of Goodville, in the county of Lancaster, and State of Pennsylvania, have invented new and useful Improvements on Separators on Threshing-Machines; and I do hereby declare that the following is a full, clear, and exact description of the construction and operation of the same, reference being had to the accompanying drawings, making a part of this specification, in which—

Figure 1 is a perspective view of the box and perforated sliding slats, set at an angle, say, of fifty degrees.

Figure 2, the under side, with the bottom removed, to show the compound crank and toothed propellers under the perforated slats.

Figure 3, the manner of attaching the bottom, illustrated.

Figures 4, parts in detail of the sliding arrangement.

Figures 5, a side view.

Figures 6, end views.

The nature of my invention consists in the arrangement and combination of the several parts, in such a manner that the grain will be more effectually separated from the straw in a separator not more than half the ordinary length, without the use of power to operate a shaker, and at the same time to prevent the straw from becoming entangled in the crank, so as to clog or impede their action, and one that can be applied to any threshing-machine and winnowing-device, simple in its construction, and efficient in every respect.

To enable others skilled in the art to make and use my invention, I will proceed to describe its construction and operation.

The slides A A' are simply framed, and held together by headed iron rods, b, with burrs on screw-ends.

B shows a perforated board across the front, under which are six (more or less) parallel adjoining slats, D, with bevelled or raised sides, forming a kind of shallow trough, without intervening space, constituting the straw-bed, or platform.

These perforated slats D are connected behind to a hinged piece, F, to which latter the toothed rod G is hinged.

This hinge-piece F has a peg or lug on each side, which slides in a groove on the side of the intermediate blocks E.

These guide-blocks, or pieces are fixed to the face of the inclined cross-board H, in the rear of the box A A', and are stationary.

The hinged rod G is provided with rake-like teeth, which pass through a series of holes made for them, centrally, in each slat.

Toward the forward end, the rake-rods G are connected with the compound crank C, in suitable boxes, so as to rise and fall alternately with the revolution of the crank.

The operation is so, that the teeth, in penetrating beyond the upper surface of the slats, draw the slats back and forth alternately, giving them a sliding and slightly shaking motion. These slats form the bed for the straw, which the teeth carry backward and upward. Inclined spikes, or pins, inserted on the sides of the slats, will prevent the straw from coming back, as it is fed upward, and carried off in the rear by the action of the rake-like teeth and sliding slats, besides the central perforations in the slats, for the action of the teeth, which do not become wholly disengaged, but are so formed, that when the slides are drawn down, the teeth are just even with the upper surface, so they cannot fail to perform their work.

The inclination of the box, or sliding slats, and the additional side-perforations, allow the grain to fall through, mostly by its own gravitation, in rear of the cylinders, but no grains can remain mixed with the straw, even in the short distance it has to be conveyed. The action effectually agitates the straw, and separates every grain.

The fixed bottom, of smooth polished wood or metal, receives the grain, and its slanting position delivers it without the necessity of a shaking-attachment.

The crank-action being below the straw, cannot possibly become impeded by the straw becoming wrapped around it, as is the case in the toothed separators now in use, operated by compound-crank action.

I am aware that the crank and tooth-rods, or slats are not new; nor do I claim such, independently considered. Nor do I claim the hinged sliding pieces E, with the guides F and toothed rod G, apart from the connection with my closely-contiguous slats D, operated by the teeth aforesaid.

The novelty mainly consists in the contiguous perforated sliding slats, metallic bottom, or its equivalent, the whole so inclined as to obviate the necessity of a shaking-attachment, and consequently allowing it to be made half the length of the ordinary separators, and perform its office as effectually, if not better.

What I claim as my invention, and desire to secure by Letters Patent, is—

The arrangement of the contiguous perforated sliding slats D, when connected with a hinged piece, F, or its equivalent, and to which the toothed rod G is also hinged, by a pivot, or otherwise, both jointly moving in grooved or other guides, E, affixed so as to be stationary, in combination with the crank C, to operate the combined toothed rod, sliding hinge, and slat, substantially in the manner and for the purpose specified.

ISAAC W. MARTIN.

Witnesses:
 W. B. WILEY,
 JACOB STAUFFER.